(12) United States Patent
Bishop et al.

(10) Patent No.: US 11,035,781 B2
(45) Date of Patent: Jun. 15, 2021

(54) AUTOMATED INFRARED SPECTROMETER LIQUID TRANSMISSION CELL FILLING AND FLUSHING DEVICE

(71) Applicant: The United States of America, as represented by the Secretary of the Navy, Crane, IN (US)

(72) Inventors: Michael L. Bishop, Norco, CA (US); Christopher H. Clark, Norco, CA (US); Gary G. Yeakley, Norco, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 239 days.

(21) Appl. No.: 16/263,780

(22) Filed: Jan. 31, 2019

(65) Prior Publication Data

US 2020/0025676 A1 Jan. 23, 2020

Related U.S. Application Data

(60) Provisional application No. 62/624,283, filed on Jan. 31, 2018.

(51) Int. Cl.
*B67D 7/36* (2010.01)
*G01N 21/11* (2006.01)
*B67D 7/02* (2010.01)

(52) U.S. Cl.
CPC ............... *G01N 21/11* (2013.01); *B67D 7/02* (2013.01); *B67D 7/36* (2013.01); *G01N 2021/115* (2013.01)

(58) Field of Classification Search
CPC .... G01N 21/11; G01N 2021/115; B67D 7/36; B67D 7/02
See application file for complete search history.

(56) References Cited

U.S. PATENT DOCUMENTS 5,567,307 A * 10/1996 Karmarkar ............. G01N 30/96
210/198.2

* cited by examiner

*Primary Examiner* — Jason K Niesz
(74) *Attorney, Agent, or Firm* — Naval Surface Warfare Center, Crane Division; Eric VanWiltenburg

(57) ABSTRACT

The present invention relates to an automated liquid transmission cell system capable of transferring solvents and samples to clean and fill the transmission cells. Three valves allow a plurality of system configurations to perform a variety of flushing and filling processes by changing the position of each valve. A plurality of tubes are connected to two of the valves such that changing the valve positions will redirect fluid transmission paths.

2 Claims, 11 Drawing Sheets

AUTOMATED INFRARED SPECTROMETER LIQUID TRANSMISSION CELL FILLING AND FLUSHING DEVICE

CROSS-REFERENCE TO RELATED APPLICATIONS

This patent application claims the benefit of U.S. Provisional Application No. 62/624,283, titled "AUTOMATED INFRARED SPECTROMETER LIQUID TRANSMISSION CELL FILLING AND FLUSHING DEVICE", filed Jan. 31, 2018, and U.S. Provisional Application No. 62/625,131, titled "SEALABLE SHORT-PATHLENGTH LIQUID TRANSMISSION CELL FOR FOURIER-TRANSFORM INFRARED SPECTROSCOPY APPLICATIONS", filed Feb. 1, 2018, the disclosures of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,499) is assigned to the United States Government and is available for licensing for commercial purposes. Licensing and technical inquiries may be directed to the Technology Transfer Office, Naval Surface Warfare Center Corona Division, email: CRNA_CTO@navy.mil.

FIELD OF THE INVENTION

The present invention relates to an automated liquid transmission cell system capable of transferring solvents and samples to clean and fill the transmission cells.

BACKGROUND AND SUMMARY OF THE INVENTION

The present invention relates to an automated liquid transmission cell flushing/filling device providing repeatable means for single or for different multiple users to reproducibly clean a liquid transmission cell or other item with solvent and to fill the liquid transmission cell or other device with a solvent or with a sample solution.

Commercially-available liquid transmission cells are equipped with two Luer-lock ports. These commercially-available cells are designed to be filled and flushed manually by attaching two Luer-lock syringes to the Luer-lock ports on a liquid transmission cell. One Luer-lock syringe is pulled to produce a negative pressure that will draw a volume of solvent or sample from another Luer-lock syringe into the cell. Commercial liquid transmission cells are emptied by attaching an empty Luer-lock syringe to a Luer-lock port on a liquid transmission cell and pulling the plunger of the syringe to draw a sample or a solvent out of the cell. In the current work, this method has not enabled different practitioners to generate repeatable Fourier-transform infrared (FTIR) measurement results—presumably because residual contaminants in the transmission cells cause interference with sample FTIR measurements. The success of the method is thus observed to be highly dependent upon the individual technique of the practitioner. In current project work, special, tight-tolerance syringe sets with serialized, matching barrels and plungers is required to eliminate air leakage into a liquid transmission cell when the sample is loaded into a cell. Normal wear from use can cause these syringes to leak and thereby introduce air into a sample in a cell. The syringes are made from glass and are also subject to breakage.

According to an illustrative embodiment of the present disclosure, a filling and flushing system provides a means to transfer solvents and samples for cleaning and filling of liquid transmission cells and cleaning of the overall system. Three valves allow a plurality of system configurations to perform a variety of flushing and filling processes by changing the position of each valve. A plurality of tubes are connected to two of the valves such that changing the valve positions will redirect fluid transmission paths.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
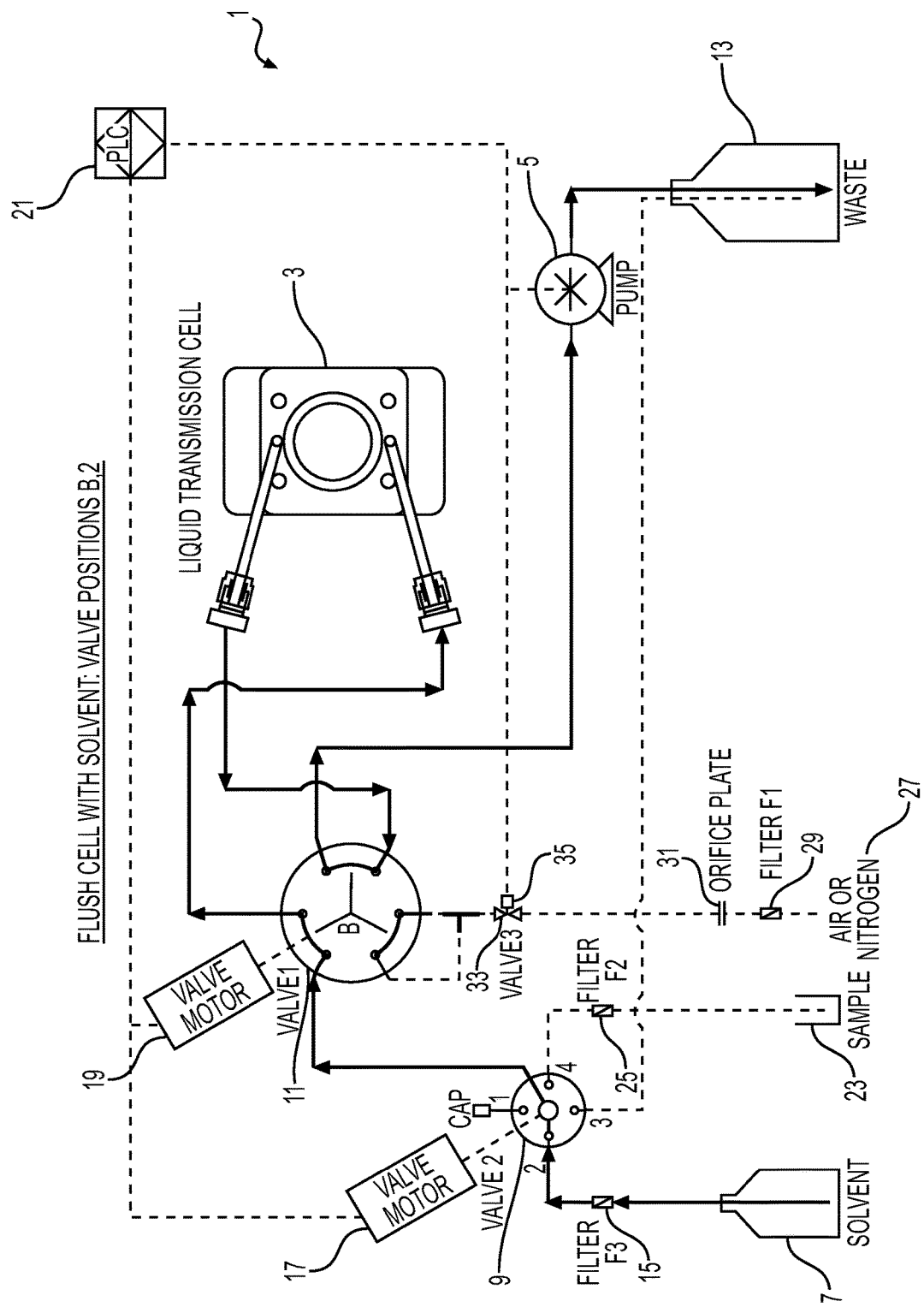
FIG. 1 shows an exemplary filling and flushing system in a first configuration.

FIG. 1 shows an exemplary filling and flushing system 1 in a first configuration. System 1 uses a first valve 9 that has four positions, but alternatively a three position valve can be used. Each position of first valve 9 connects second valve 11 to a separate line, where a second first valve position connects to a solvent reservoir 7, a third first valve position connects to a waste reservoir 13, and a fourth first valve position connects to a sample reservoir 23. A first valve position is unused in this embodiment and has been capped to prevent the flow of fluids through that position. System 1 uses a second valve 11 that has a first and a second valve position. Second valve 11 has six connection ports which create third transmission paths, with each second valve position affecting where each connection port leads. Each system 1 configuration has a configuration path set up by changing the first valve positions and second valve positions to allow for processes to occur. A third valve 33 with two positions can be used to restrict or stop the flow of gas from a neutral gas reservoir 27. A first valve motor 17 can be used to change the positions of first valve 9. A second valve motor 19 can be used to change the positions of second valve 11. A third valve motor 35 can be used to change the positions of third valve 33. Pump 5 draws fluid (e.g., solvent, sample, air, nitrogen, etc.) through each configuration path and deposits the fluid into waste reservoir 13. Controller 21 can be used to control first valve motor 17, second valve motor 19, third valve motor 35, and pump 5. A first filter 15 can be placed between solvent reservoir 7 and first valve 9 to ensure that only fluids enter first valve 9. A second filter 25 can be placed between sample reservoir 23 and first valve 9 to ensure that only fluids enter first valve 9. A third filter 29 can be placed between neutral gas reservoir 27 and third valve 33 to ensure that only fluids enter third valve 33. An flow restrictor (e.g., an orifice plate) can be placed between neutral gas reservoir 27 and second valve 11 to restrict the flow of gas. A sample fill tube connects sample reservoir 23 to first valve 1, a solvent fill tube connects solvent reservoir 7 to first valve 1, a waste disposal tube connects waste reservoir 13 to first valve 1, and a gas fill tube connects gas reservoir 27 to third valve 33.

Figure 4:
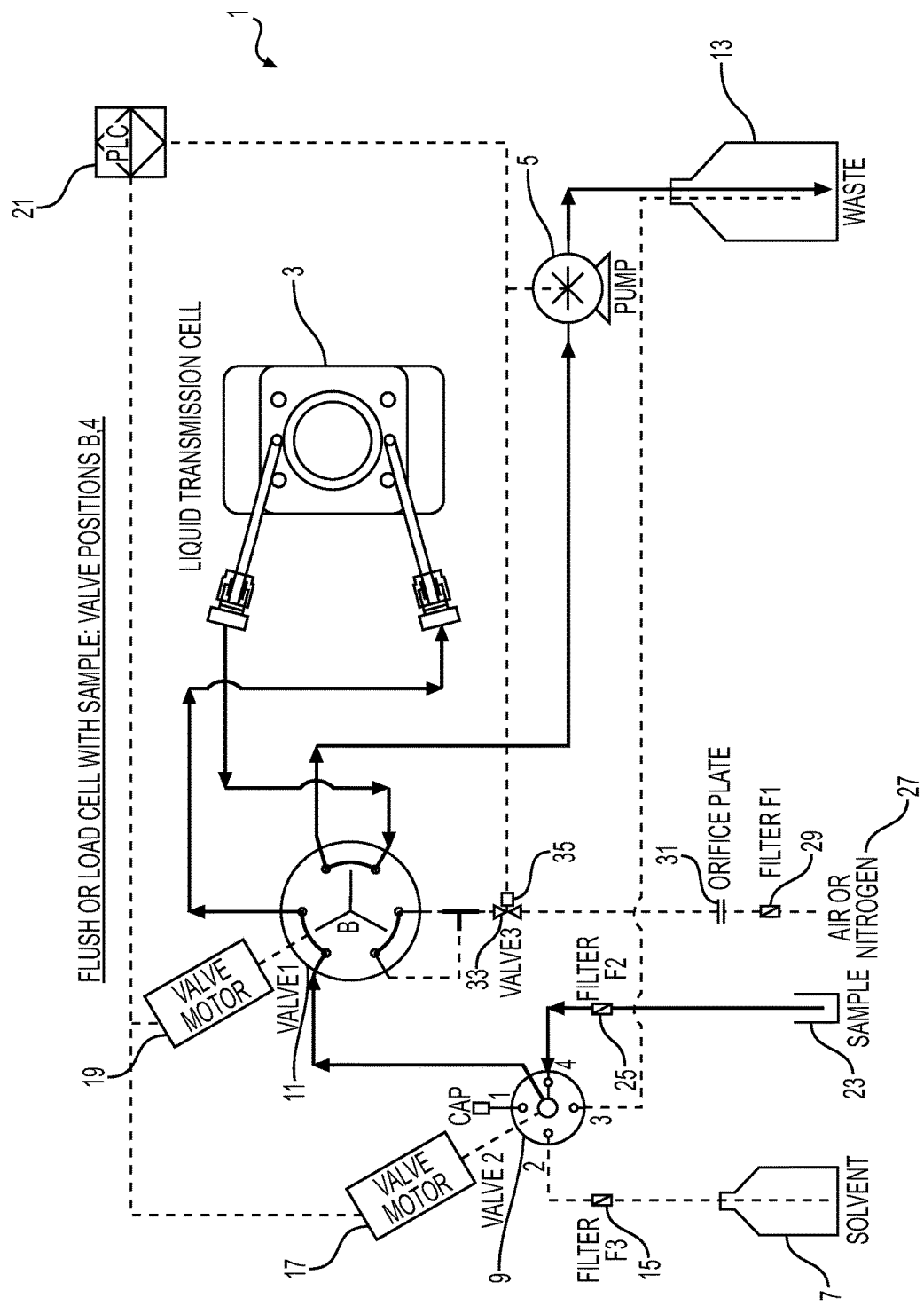
FIG. 4 shows an exemplary filling and flushing system in a fourth configuration.

The first configuration allows cell 3 to be flushed/loaded with a solvent to clean the cell 3 and tubing along the path that a sample will touch (e.g., as seen in FIG. 4). First valve 9 is set to the second first valve position and the second valve 11 is set to a second second valve position. The third valve is closed to prevent neutral gas from flowing from neutral gas reservoir 27 to second valve 11. To load the cell, pump 5 draws the solvent from a solvent reservoir 7 to a first valve 9, a second valve 11, cell 3, second valve 11, pump 5, and then to a waste reservoir 13.

Figure 2:
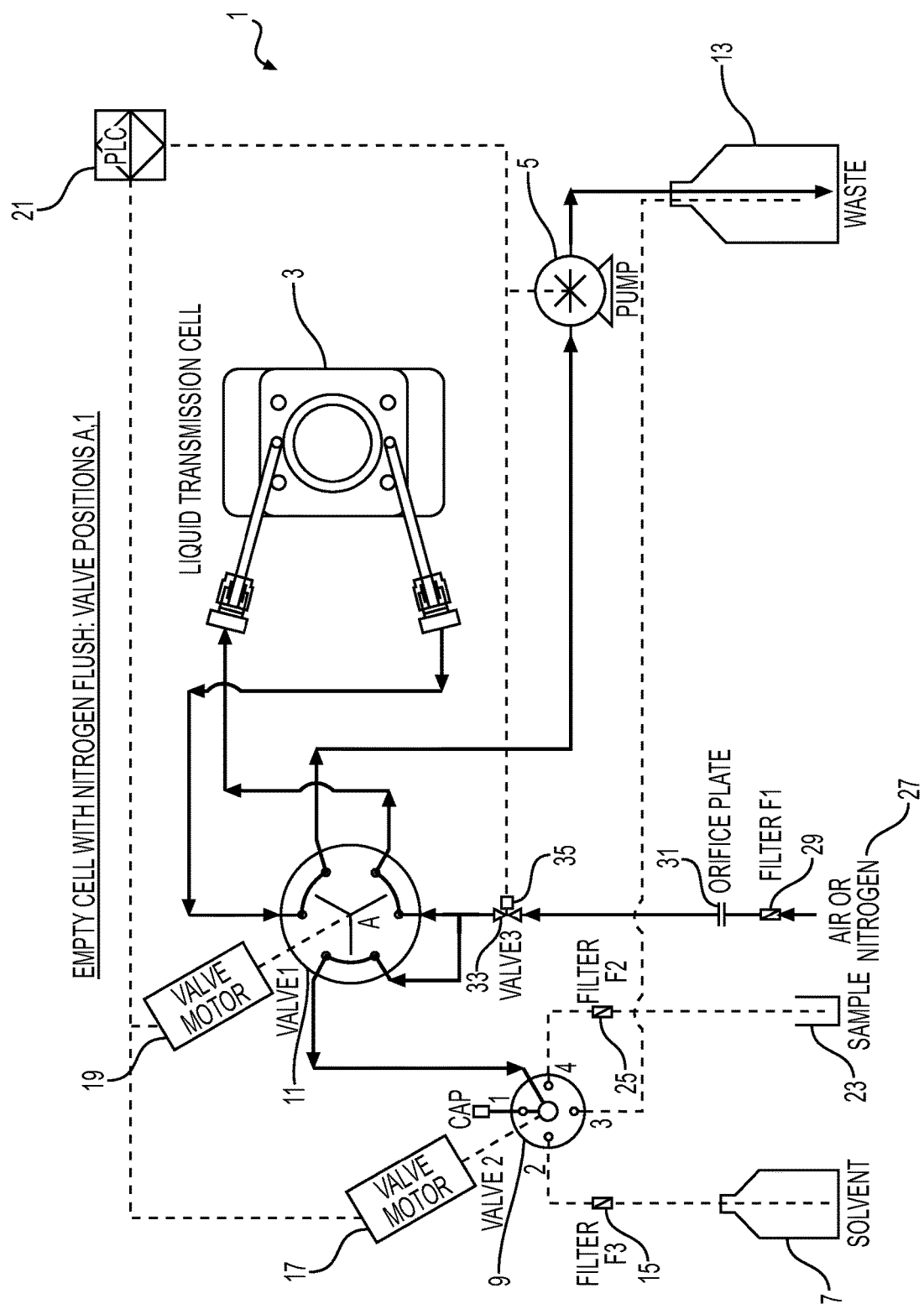
FIG. 2 shows an exemplary filling and flushing system in a second configuration.

FIG. 2 shows an exemplary filling and flushing system 1 in a second configuration. The second configuration allows cell 3 to be flushed with a neutral gas (e.g., nitrogen) to remove leftover solvent from the cell after the process of FIG. 1 or remove leftover sample from the cell after the process of FIG. 4. First valve 9 is set to the first valve position and the second valve 11 is set to a first second valve position. The third valve is open to permit neutral gas to flow from neutral gas reservoir 27 to second valve 11. Pump 5 draws the neutral gas from a neutral gas reservoir 27 to third valve 33, a second valve 11, cell 3, second valve 11, pump 5, and then to a waste reservoir 13. A tubing branch between third valve 33 and second valve 11 directs some of the neutral gas to first valve 9. While first valve 9 could be set to the third first valve position (sending the gas to the waste reservoir), the first valve position is used to conserve gas by preventing the flow of gas through this branch. Alternatively, first valve 9 could be set to the third first valve position and a fourth valve could be utilized to restrict the flow of gas between the third valve 33 and second valve 11 or between the second valve 11 and first valve 9.

Figure 3:
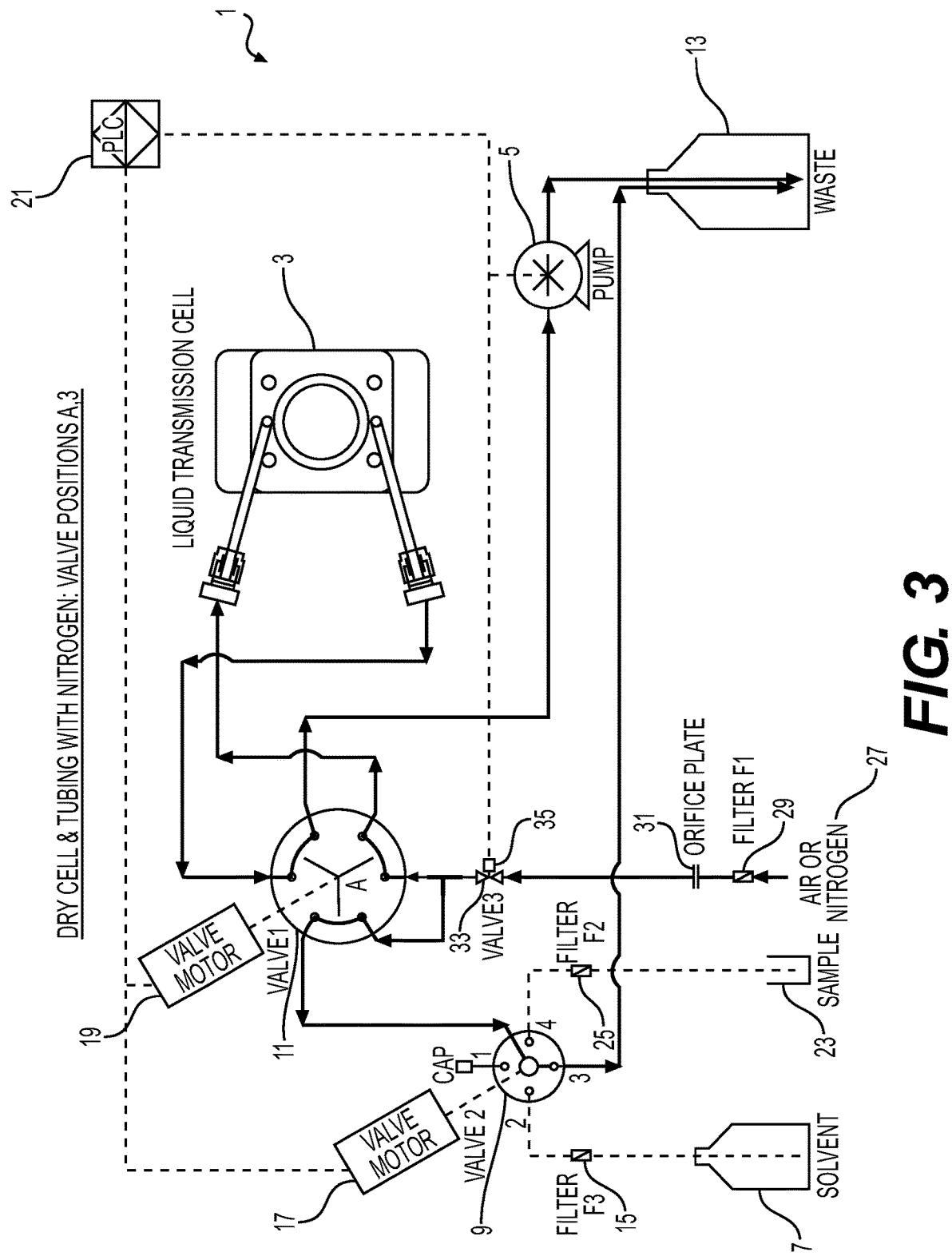
FIG. 3 shows an exemplary filling and flushing system in a third configuration.

FIG. 3 shows an exemplary filling and flushing system 1 in a third configuration. The third configuration allows cell 3 and tubing of the sample path (e.g., as seen in FIG. 4) to be dried by a neutral gas (e.g., nitrogen). First valve 9 is set to the third first valve position and the second valve 11 is set to the first second valve position. The third valve is open to permit neutral gas to flow from neutral gas reservoir 27 to second valve 11. Pump 5 draws the neutral gas from neutral gas reservoir 27 to third valve 33, second valve 11, cell 3, second valve 11, pump 5, and then to waste reservoir 13. A tubing branch between third valve 33 and second valve 11 directs some of the neutral gas to first valve 9. Gas in this branch is deposited into waste reservoir 13.

FIG. 4 shows an exemplary filling and flushing system 1 in a fourth configuration. The fourth configuration allows cell 3 to be flushed/loaded with a sample. First valve 9 is set to the fourth first valve position and the second valve 11 is set to the first second valve position. The third valve is closed to prevent neutral gas from flowing from neutral gas reservoir 27 to second valve 11. To load the cell, pump 5 draws the sample from sample reservoir 23 to first valve 9, second valve 11, cell 3, second valve 11, pump 5, and then to waste reservoir 13. To flush the cell, the second configuration, as seen in FIG. 2, is used to remove the sample from the cell after loading the cell.

Figure 5:
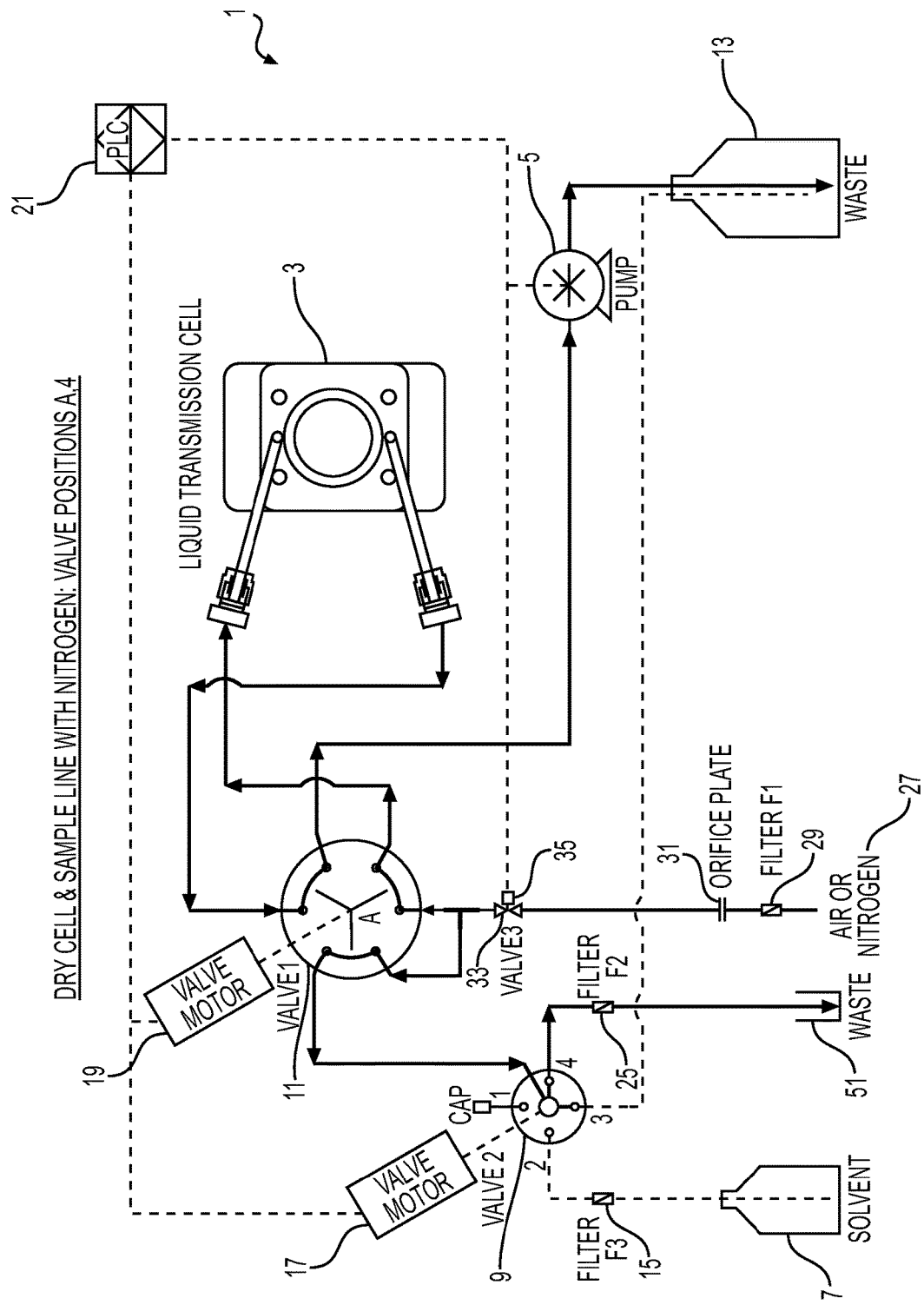
FIG. 5 shows an exemplary filling and flushing system in a fifth configuration.

FIG. 5 shows an exemplary filling and flushing system 1 in a fifth configuration. The fifth configuration allows cell 3 and tubing to be emptied after flushing/loading a sample. First valve 9 is set to the fourth first valve position and the second valve 11 is set to the first second valve position. The third valve is open to permit neutral gas to flow from neutral gas reservoir 27 to second valve 11. Sample reservoir (not shown) is replaced by a second waste reservoir 51 and the first valve is set to the fourth first valve position instead of the first or third first valve position to utilize second filter 25.

Figure 6:
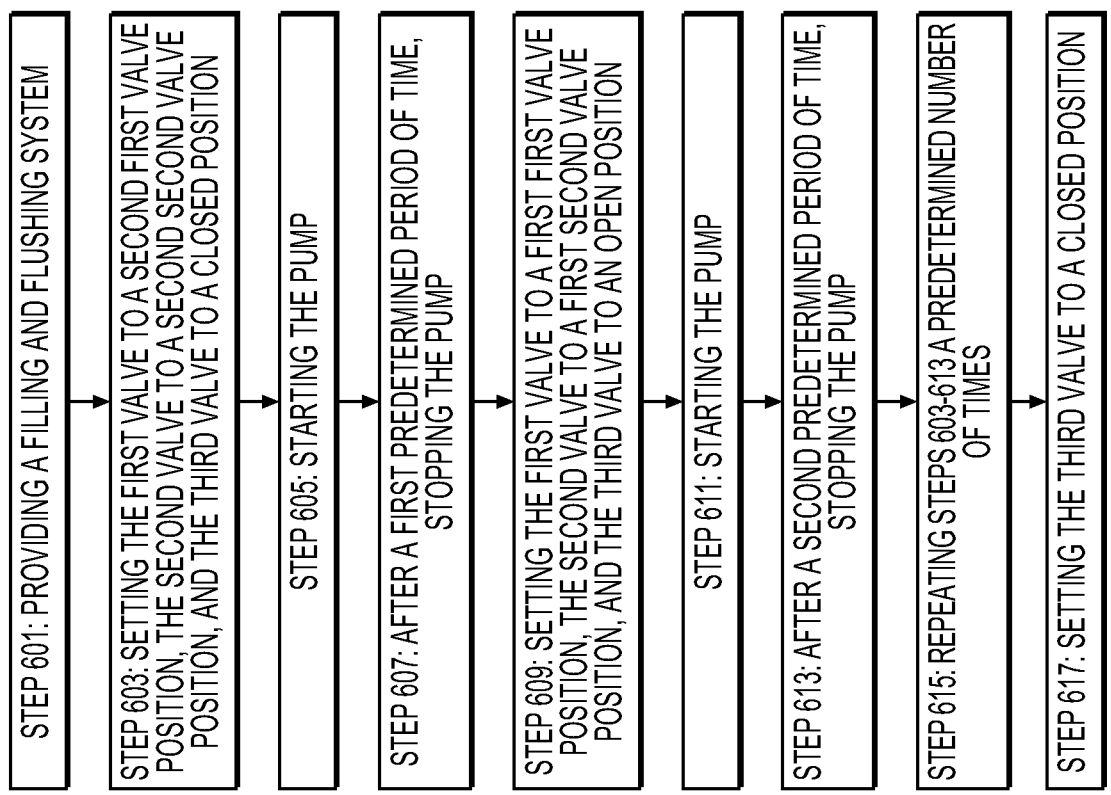
FIG. 6 shows an exemplary method of rinsing a filling and flushing system with solvent.

FIG. 6 shows an exemplary method of rinsing a filling and flushing system with solvent. At step 601: Providing a filling and flushing system. At step 603: Setting the first valve to a second first valve position, the second valve to a second valve position, and the third valve to a closed position. At step 605: Starting the pump. At step 607: After a first predetermined period of time, stopping the pump. At step 609: Setting the first valve to a first first valve position, the second valve to a first second valve position, and the third valve to an open position. At step 611: Starting the pump. At step 613: After a second predetermined period of time, stopping the pump. At step 615: Repeating steps 603-613 a predetermined number of times. At step 617: Setting the third valve to a closed position.

Figure 7:
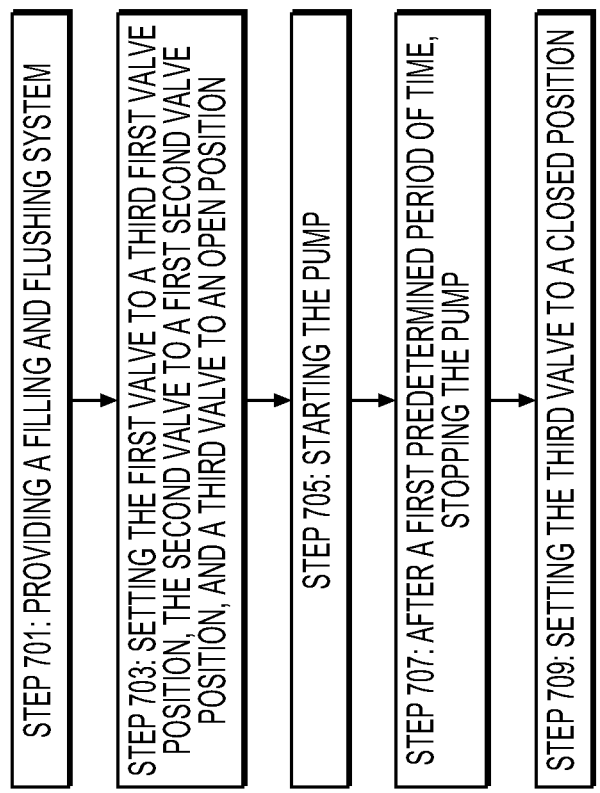
FIG. 7 shows an exemplary method of drying a filling and flushing system with a gas.

FIG. 7 shows an exemplary method of drying a filling and flushing system with a neutral gas. At step 701: Providing a filling and flushing system. At step 703: Setting the first valve to a third first valve position, the second valve to a first second valve position, and a third valve to an open position. At step 705: Starting the pump. At step 707: After a first predetermined period of time, stopping the pump. At step 709: Setting the third valve to a closed position.

Figure 8:
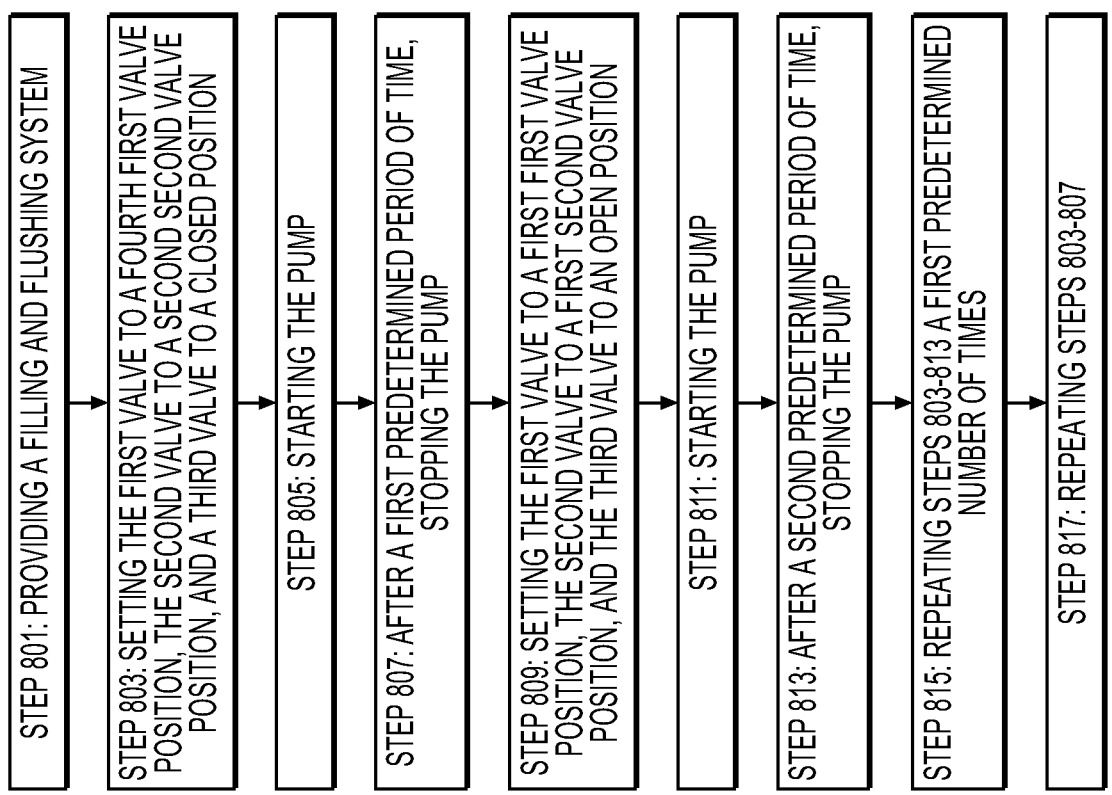
FIG. 8 shows an exemplary method of rinsing and loading a cell in a filling and flushing system.

FIG. 8 shows an exemplary method of rinsing and loading a cell in a filling and flushing system. At step 801: Providing a filling and flushing system. At step 803: Setting the first valve to a fourth first valve position, the second valve to a second valve position, and a third valve to a closed position. At step 805: Starting the pump. At step 807: After a first predetermined period of time, stopping the pump. At step 809: Setting the first valve to a first first valve position, the second valve to a first second valve position, and the third valve to an open position. At step 811: Starting the pump. At step 813: After a second predetermined period of time, stopping the pump. At step 815: Repeating steps 803-813 a first predetermined number of times. At step 817: Repeating steps 803-807.

Figure 9:
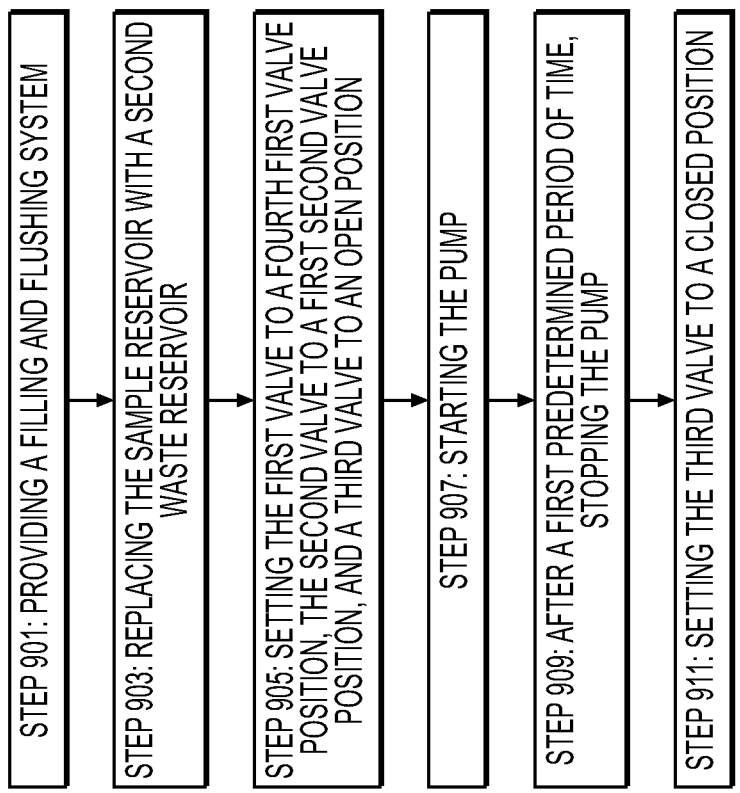
FIG. 9 shows an exemplary method of emptying the sample lines and cell in a filling and flushing system after filling/flushing a cell.

FIG. 9 shows an exemplary method of emptying the sample lines and cell in a filling and flushing system after filling/flushing a cell. At step 901: Providing a filling and flushing system. At step 903: Replacing the sample reservoir with a second waste reservoir. At step 905: Setting the first valve to a fourth first valve position, the second valve to a first second valve position, and a third valve to an open position. At step 907: Starting the pump. At step 909: After a first predetermined period of time, stopping the pump. At step 911: Setting the third valve to a closed position.

Figure 10:
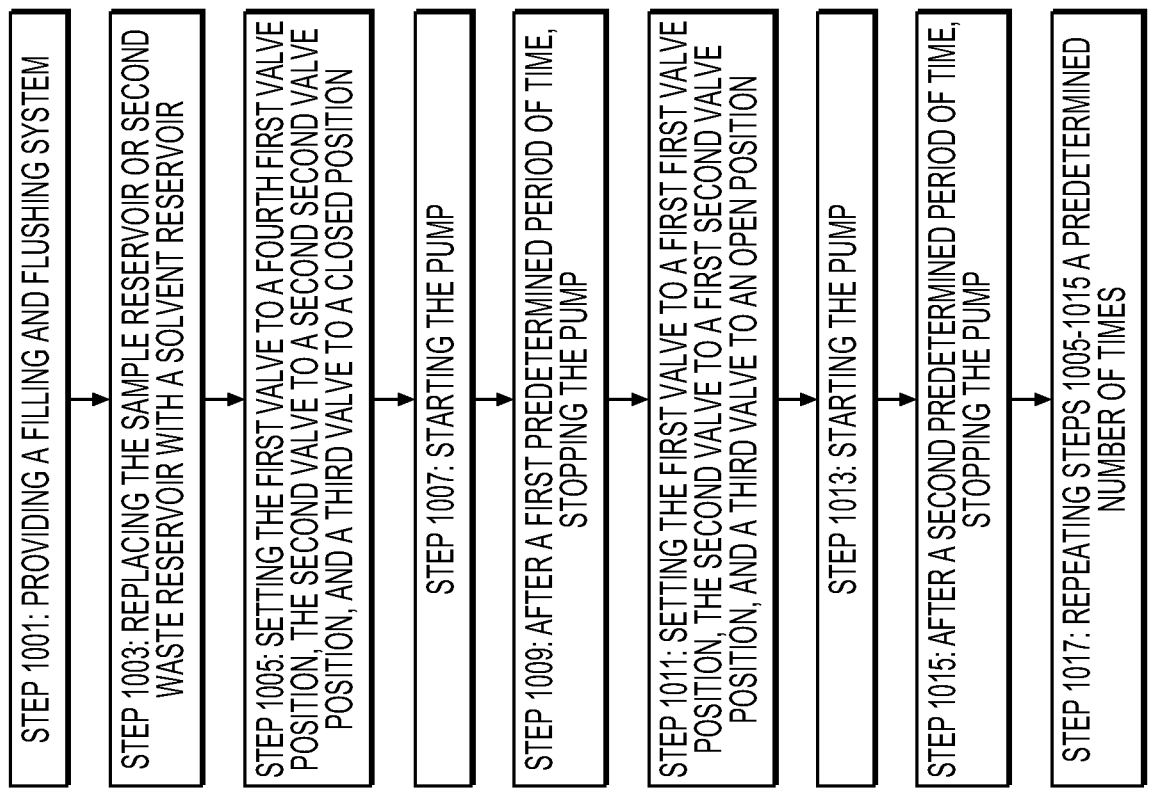
FIG. 10 shows an exemplary method of flushing the sample lines and cell with a solvent.

FIG. 10 shows an exemplary method of flushing the sample lines and cell with a solvent. At step 1001: Providing a filling and flushing system. At step 1003: Replacing the sample reservoir or second waste reservoir with a solvent reservoir. At step 1005: Setting the first valve to a fourth first valve position, the second valve to a second valve position, and a third valve to a closed position. At step 1007: Starting the pump. At step 1009: After a first predetermined period of time, stopping the pump. At step 1011: Setting the first valve to a first valve position, the second valve to a first second valve position, and a third valve to an open position. At step 1013: Starting the pump. At step 1015: After a second predetermined period of time, stopping the pump. At step 1017: Repeating steps 1005-1015 a predetermined number of times.

Figure 11:
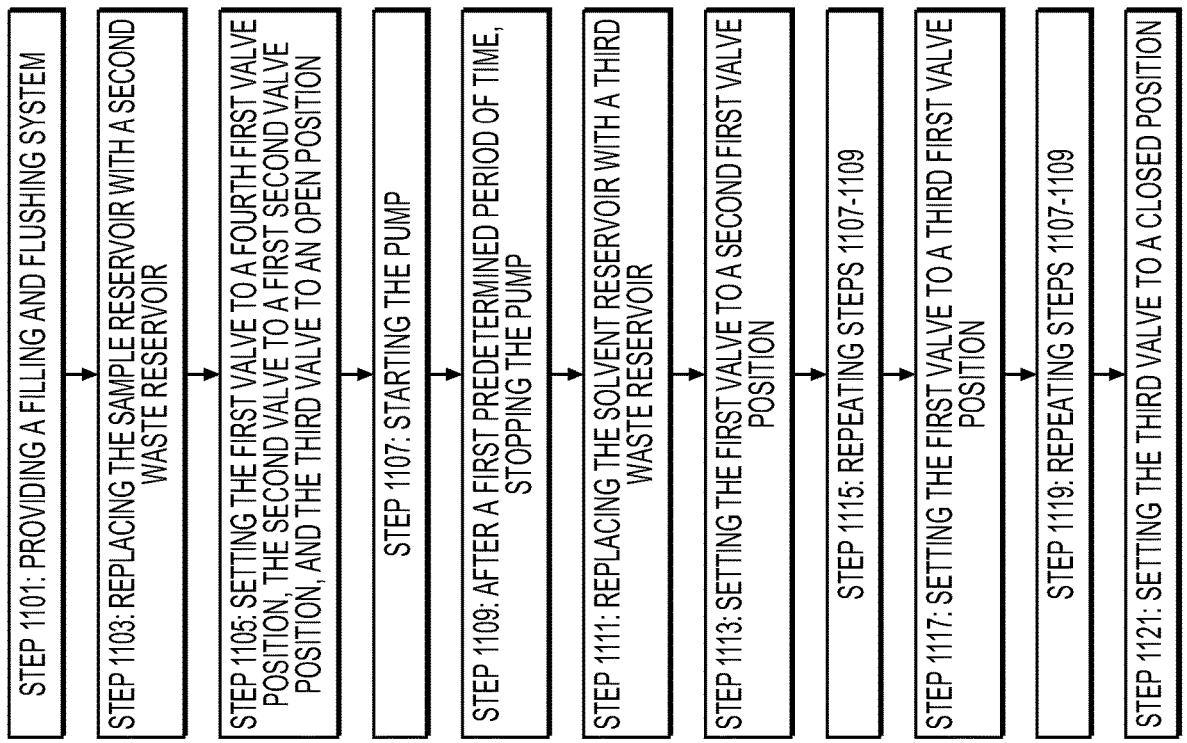
FIG. 11 shows an exemplary method of drying the cell and tubing to prepare for shutdown of a filling and flushing system.

FIG. 11 shows an exemplary method of drying the cell and tubing to prepare for shutdown of a filling and flushing system. At step 1101: Providing a filling and flushing system. At step 1103: Replacing the sample reservoir with a second waste reservoir. At step 1105: Setting the first valve to a fourth first valve position, the second valve to a first second valve position, and the third valve to an open position. At step 1107: Starting the pump. At step 1109: After a first predetermined period of time, stopping the pump. At step 1111: Replacing the solvent reservoir with a third waste reservoir. At step 1113: Setting the first valve to a second first valve position. At step 1115: Repeating steps 1107-1109. At step 1117: Setting the first valve to a third first valve position. At step 1119: Repeating steps 1107-1109. At step 1121: Setting the third valve to a closed position.

Exemplary embodiments of the filling and flushing system can be made with or without the valve motors and controller. Any function performed by these electronic components can be performed by hand. However, the reliability of the automated system makes using these components preferable. A controller can be programmed to control a sequence of such operations multiple times. In this example, a controller can also be programmed to change pumping speed or length of pumping time for different segments of a cycle. In this example, a controller can be programmed to end a cycle with a liquid transmission cell filled with a liquid sample, or resume the cycle to flush the liquid sample out. The automated liquid transmission cell flushing/filling device can provide a means for a user to attain comparable effectiveness in cleaning liquid transmission cells from one time to another, thus providing a means for a user to generate repeatable FTIR measurements.

Automated systems also have the advantage of enabling scalability. When an entity prepares to field the measurement methodology that this device was designed to support, each calibration laboratory that will use the method will need multiple sets of sealed liquid transmission cells that contain reference solutions. The entity that prepares these reference-solution cells will have to clean and to fill several hundred of them. The automated liquid transmission cell flushing/filling device can be used to facilitate this process by using multiple pumps or multi-channel pumps fill many cells with one system.

Although the invention has been described in detail with reference to certain preferred embodiments, variations and modifications exist within the spirit and scope of the invention as described and defined in the following claims.

The invention claimed is:

1. A liquid transmission cell system comprising:
a liquid transmission cell comprising a first and a second cell port;
a first valve assembly having four connection positions, wherein each of the four connection positions connects, respectively, a first, second, third, and fourth connection port to a fifth connection port;
a solvent fill tube coupled to the second connection port;
a waste disposal tube connected to the third connection port;
a sample fill tube coupled to the fourth connection port;
a second valve assembly having two rotation positions and first, second, third, fourth, fifth, and sixth pairing connection ports, wherein each rotation position couples each pairing connection port with one of two adjacent pairing connection ports such that each position creates three pairs of pairing connection ports, wherein fluid passes between each pair of pairing connection ports;
a third valve assembly having a first and a second gas connection port;
a gas fill tube coupled to the first gas connection port;
a first waste reservoir;
wherein the first pairing connection port is coupled to the first cell port;
wherein the second pairing connection port is coupled to the first waste reservoir;
wherein the third pairing connection port is coupled to the second cell port;
wherein the fourth pairing connection port is coupled to the second gas connection port;
wherein the fifth pairing connection port is coupled to the second gas connection port;
wherein the sixth pairing connection port is coupled to fifth connection port.

2. The system of claim 1, further comprising a pump disposed between the first waste reservoir and the second pairing connection port.

* * * * *